(12) United States Patent
Gharb et al.

(10) Patent No.: US 12,336,531 B2
(45) Date of Patent: Jun. 24, 2025

(54) PORTABLE, EX VIVO, NORMOTHERMIC LIMB PERFUSION MACHINE

(71) Applicant: THE CLEVELAND CLINIC FOUNDATION, Cleveland, OH (US)

(72) Inventors: Bahar Bassiri Gharb, Westlake, OH (US); Antonio Rampazzo, Cleveland, OH (US); Varun Lingaiah Kopparthy, Cleveland, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 0 days.

(21) Appl. No.: 18/635,264

(22) Filed: Apr. 15, 2024

(65) Prior Publication Data
US 2024/0268373 A1    Aug. 15, 2024

Related U.S. Application Data

(62) Division of application No. 17/207,858, filed on Mar. 22, 2021, now Pat. No. 11,974,568.

(60) Provisional application No. 62/992,260, filed on Mar. 20, 2020.

(51) Int. Cl.
| | |
|---|---|
| A01N 1/143 | (2025.01) |
| A01N 1/12 | (2025.01) |
| A01N 1/126 | (2025.01) |
| A01N 1/146 | (2025.01) |

(52) U.S. Cl.
CPC .............. *A01N 1/143* (2025.01); *A01N 1/12* (2025.01); *A01N 1/126* (2025.01); *A01N 1/146* (2025.01)

(58) Field of Classification Search
CPC .......... A01N 1/143; A01N 1/12; A01N 1/126; A01N 1/146
See application file for complete search history.

(56) References Cited

U.S. PATENT DOCUMENTS

| | | | |
|---|---|---|---|
| 2009/0324748 A1 | 12/2009 | Dobson | |
| 2015/0342177 A1* | 12/2015 | Hassanein | .............. C12M 29/10 435/284.1 |

FOREIGN PATENT DOCUMENTS

| | | | | |
|---|---|---|---|---|
| WO | WO-0018226 A2 * | 4/2000 | .............. | A01N 1/02 |

OTHER PUBLICATIONS

Duraes, Eliana F. R., et al: "Developing a protocol for normothermic ex-situ limb perfusion", Microsurgery, Feb. 2018; 38(2): 185-194, doi: 10.1002/micr.30252. Epub Oct. 9, 2017. PMID: 28990205.

(Continued)

*Primary Examiner* — Michael L Hobbs
(74) *Attorney, Agent, or Firm* — Tarolli, Sundheim, Covell & Tummino LLP

(57) ABSTRACT

A portable, ex vivo perfusion system for preserving detached biological tissue includes a receptacle for housing the tissue in a normothermic environment, a perfusion core to pump perfusate through the tissue via at least one conduit, at least one detection device to measure parameters during perfusion, and at least one parameter control device to maintain the parameter in a predetermined threshold. The system also include a controller with instructions to receive the measured parameters, compare the parameters to predetermined thresholds, and when the parameters are outside the thresholds change an output of the at least one parameter control device to get the parameters within the threshold and alert a user that parameters were outside the thresholds.

20 Claims, 9 Drawing Sheets

(56) References Cited

OTHER PUBLICATIONS

Pozza, Dalla E., et al: "Ex-Situ Extended Limb Preservation: A Protocol for Porcine Limb Perfusion Am J Transplant", 2017;17 (suppl 3): 305-306.

* cited by examiner

300

```
┌─────────────────────────────────────────────────────────────┐
│ PUMP A SUBSTRATE INFUSION INTO A FIRST PERFUSATE RESERVOIR  │
│ 302                HOLDING PERFUSATE                        │
└─────────────────────────────────────────────────────────────┘
                              │
                              ▼
┌─────────────────────────────────────────────────────────────┐
│ MIX THE PERFUSATE IN THE FIRST RESERVOIR WITH THE SUBSTRATE │
│ 304                       INFUSION                          │
└─────────────────────────────────────────────────────────────┘
                              │
                              ▼
┌─────────────────────────────────────────────────────────────┐
│  DETECT WHEN CONCENTRATIONS OF THE PERFUSATE AND/OR         │
│  SUBSTRATE IN THE FIRST PERFUSATE RESERVOIR ARE OUTSIDE A   │
│ 306         PREDETERMINED CONCENTRATION LEVEL               │
└─────────────────────────────────────────────────────────────┘
                              │
                              ▼
┌─────────────────────────────────────────────────────────────┐
│  EXCHANGE PERFUSATE FROM A SECOND PERFUSATE RESERVOIR       │
│  HOLDING COOLED PERFUSATE TO THE FIRST PERFUSATE RESERVOIR  │
│  WHEN THE AMOUNT OF PERFUSATE IN THE FIRST RESERVOIR IS BELOW│
│ 308       THE PREDETERMINED CONCENTRATION LEVEL             │
└─────────────────────────────────────────────────────────────┘
                              │
                              ▼
┌─────────────────────────────────────────────────────────────┐
│ DETECT THAT A CONCENTRATION OF ANALYTES IN THE PERFUSATE IS │
│ 310     ABOVE A PREDETERMINED CONCENTRATION THRESHOLD       │
└─────────────────────────────────────────────────────────────┘
                              │
                              ▼
┌─────────────────────────────────────────────────────────────┐
│ REMOVE AT LEAST A PORTION OF THE PERFUSATE COMPRISING THE   │
│ ANALYTES FROM THE FIRST PERFUSATE RESERVOIR INTO A THIRD    │
│ 312                  PERFUSATE RESERVOIR                    │
└─────────────────────────────────────────────────────────────┘
```

FIG. 9

PORTABLE, EX VIVO, NORMOTHERMIC LIMB PERFUSION MACHINE

RELATED APPLICATIONS

This application is a Divisional patent application of U.S. patent application Ser. No. 17/207,858, filed Mar. 22, 2021, which claims the benefit of U.S. Provisional Application No. 62/992,620, entitled "NORMOTHERMIC EX-SITU LIMB PERFUSION MACHINE/DEVICE," filed Mar. 20, 2020. The entirety of the disclosures of each are hereby incorporated by reference herein.

TECHNICAL FIELD

The present disclosure relates generally to ex-vivo biological tissue perfusion and, more specifically, to systems and methods that employ a portable, ex vivo, normothermic perfusion machine to preserve a detached biological tissue.

BACKGROUND

Trauma is the cause of approximately half of the amputations performed in the United States each year. Limbs that are otherwise healthy but have been amputated by or because of a traumatic event or electively procured from a donor have the potential to be re-attached or transplanted to a patient. However, when multiple life-threatening injuries are present, replantation of a limb is often delayed in order to perform live-saving procedures, resulting in the degradation or complete loss of the extremity. Extremity transplants, such as hand transplants, have become a viable treatment avenue in recent years for the population of young amputees that abandon use of prosthetics. Delay in restoring blood flow to the amputated extremity leads to tissue damage, caused by prolonged ischemia and reperfusion injury. Tissue damage is a significant limiting factor for the success of both replantation and transplantation of extremities, and other detached biological tissue (e.g., a heart, a lung, a kidney, a tissue graft, etc.). Improved methods of preservation and perfusion are needed to store ex vivo limbs, and other detached biological tissues, during the time between traumatic limb loss and replantation.

SUMMARY

A portable, ex vivo, normothermic perfusion machine can extend the storage life of detached biological tissues that need to be transplanted or replanted by ensuring that the detached biological tissue is continuously perfused and stored in a physiologic environment.

In an aspect, the present disclosure includes a portable, ex vivo, normothermic perfusion system that is mobile and can extend the functional life of a detached biological tissue for transplant or replant. The system includes the following. A receptacle sized and dimensioned to house a detached biological tissue in a normothermic environment. A perfusion core adapted to maintain the normothermic environment for the detached biological tissue by pumping a perfusate through the detached biological tissue. At least one conduit adapted to connect the perfusion core with the detached biological tissue and to transfer the perfusate from the perfusion core into and through the detached biological tissue. At least one detection device adapted to measure a parameter during perfusion of the detached biological tissue, wherein the parameter is a metabolic parameter or a physiologic parameter. At least one parameter control device adapted to maintain the parameter within at least one predetermined threshold. And a controller including a non-transitory memory storing instructions, and a processor to execute the instructions stored in the memory. The instructions to at least: receive the parameter measured by the at least one detection device, compare the parameter to the at least one predetermined threshold for the parameter, and when the parameter is outside the at least one predetermined threshold, change an output of the at least one parameter control device to maintain the parameter within the at least one predetermined threshold as the perfusate is transferred through the perfusion core, the at least one conduit, and the detached biological tissue, and alert a user of the parameter being outside the at least one predetermined threshold.

In another aspect, the present disclosure includes a method for preserving a detached biological tissue ex vivo including the following steps. Receiving, by a controller comprising a processor, at least one parameter measured by at least one detection device in a portable ex vivo perfusion system. The system includes a receptacle sized and dimensioned to house the detached biological tissue in a normothermic environment, a perfusion core adapted to maintain the normothermic environment for the detached biological tissue by pumping a perfusate through the detached biological tissue, and at least one conduit adapted to connect the perfusion core with the detached biological tissue and to transfer the perfusate from the perfusion core into and through the detached biological tissue, wherein the at least one detection device is configured to measure the at least one parameter during perfusion of the detached biological tissue. The at least one parameter is a metabolic parameter or a physiologic parameter. The controller compares the at least one parameter to at least one predetermined threshold for the at least one parameter. And, when the at least one parameter is outside the at least one predetermined threshold. The controller changes an output of at least one parameter control device of the system to maintain the at least one parameter within the at least one predetermined threshold to control the transfer of the perfusate through the perfusion core, the at least one conduit, and the detached biological tissue. The controller sends an alert to a user of the system that the at least one parameter was outside the at least one predetermined threshold.

BRIEF DESCRIPTION OF THE DRAWINGS

The foregoing and other features of the present disclosure will become apparent to those skilled in the art to which the present disclosure relates upon reading the following description with reference to the accompanying drawings, in which:

FIG. 9 is a process flow diagram of a method of exchanging perfusate.

DETAILED DESCRIPTION

I. Definitions

Figure 1:
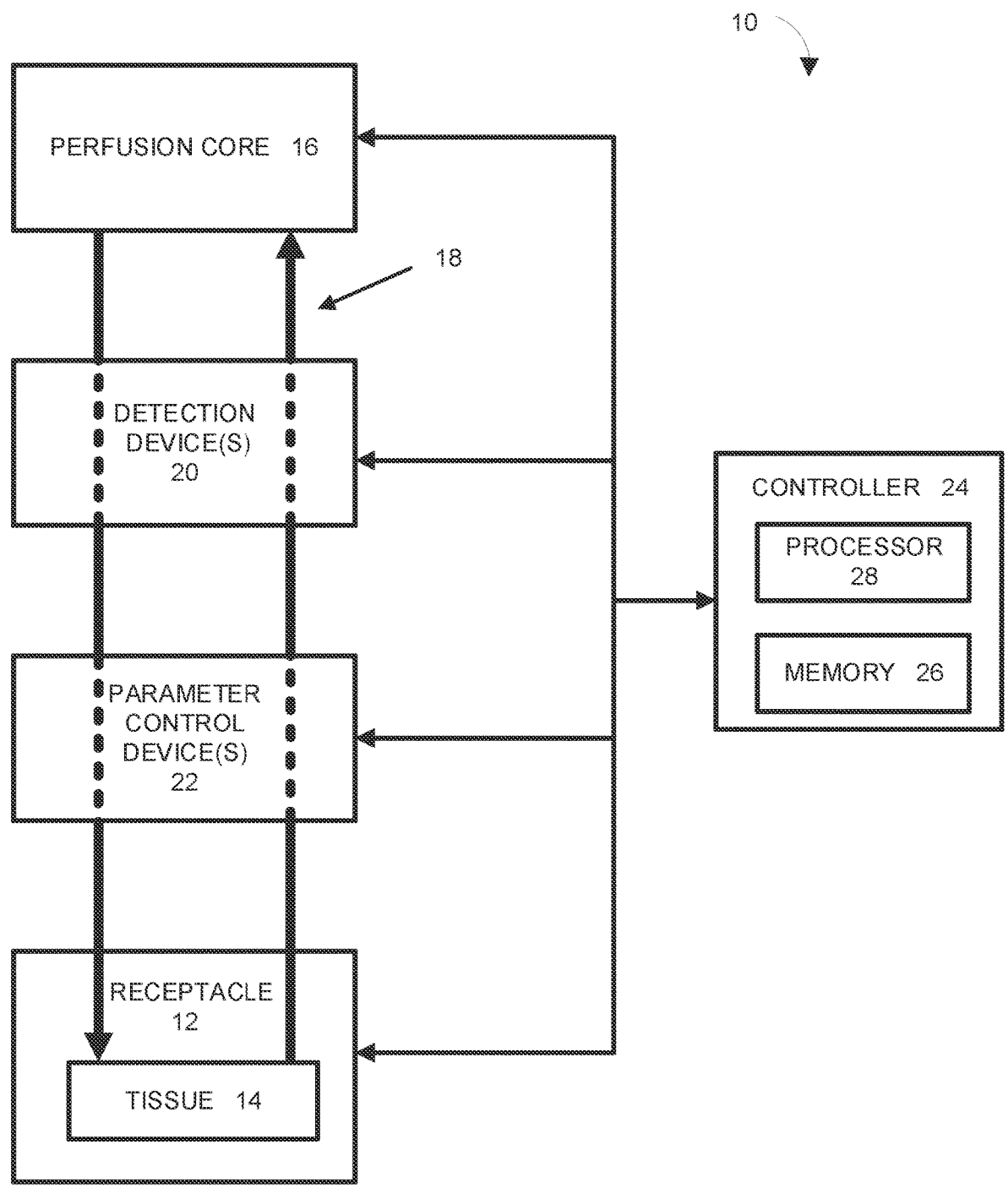
FIG. 1 is a schematic view of a system that employs a portable, ex vivo, normothermic perfusion machine.

In the context of the present disclosure, the singular forms "a," "an" and "the" can also include the plural forms, unless the context clearly indicates otherwise.

The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "detached biological tissue" refers to any detached extremity, ex-vivo body part, or vascular allograft originating from, but no longer attached, to a patient or a donor (e.g., due to trauma, disease, etc.) or grown in a laboratory setting.

As used herein, the term "extremity" refers to any portion of an appendage of a patient or donor that includes, but is not limited to, an arm, a leg, a forearm, a hand, a foot, a finger, a toe, etc.

As used herein, the term "detached" can refer to the state of something that was once attached no longer being attached. For example, an extremity can be detached from a patient or a donor due to trauma or as part of a surgical procedure.

As used herein, the term "ex-vivo" (when used to refer to a body part) refers to the body part being outside or separated from the patient or donor, as opposed to being inside or attached to the patient or donor under normal living conditions. The ex-vivo body part can include, but is not limited to, organs such as the heart, kidney, liver, lungs, pancreas, intestines, or skin.

As used herein the terms "vascularized composite allograft" and "vascularized composite autograft" refers to groups of multiple structures that are transplanted or replanted to a patient. The multiple structures can include, skin, bone, tendons, muscles, blood vessels, nerves, and connective tissue. The most well-known types of vascularized composite allografts include are hand and face transplants, but other types of vascular composite allografts exist (e.g., face, neck, abdominal wall, penis, uterus, etc.) and are included in this definition. The most well-known vascularized composite autografts are called free flaps or free tissue transfer, where the tissue is removed from and transferred to a different body site in the same patient for reconstructive purposes As used herein the term "free flap" refers to a piece of tissue that is disconnected from its original blood supply and is moved a distance to be reconnected to a new blood supply. The free flap can originate with a patient, a donor, or a culture in a laboratory setting.

As used herein, the term "patient" refers to any warm-blooded organism (e.g., a human being, a primate, a cat, a dog, a rabbit, a mouse, etc.) receiving treatment for a medical condition that requires a transplant or replant of a detached biological tissue. For example, a patient may require a limb transplant or replant due to an injury or a disease. A patient can be in any location, a hospital, a doctor office, a field hospital, etc.

As used herein, the term "donor" refers to any warm-blooded organism, living or dead, that undergoes a surgical procedure to detach a biological tissue that will be transplanted to a patient.

As used herein, the term "normothermic" refers to an environmental temperature that does not cause increased or decreased activity of cells of a body. For a human body the peak normothermic temperature range is between approximately 36 degrees Celsius and 38 degrees Celsius.

As used herein, the term "perfusion core" refers to the portion of a machine perfusion system that can include perfusion reservoirs adapted to store perfusate before and/or after it is perfused through a detached biological tissue, substrate reservoirs, tubing circuit, and infusion pumps for controlling the movements of perfusion solution within the components of the perfusion core.

As used herein, the term "perfusate" refers to a fluid comprising nutrients, substrates, metabolites, electrolytes, and an oxygen carrier that is perfused through a detached biological tissue to preserve the function and viability of the detached biological tissue.

As used herein, the term "substrate" refers to one or more materials that are added to a perfusate to help nourish the cells in a detached biological tissue.

As used herein, the term "perfusion machine" refers to a mechanical system for perfusing a perfusate through a detached biological tissue that is being held or prepared for a transplant or replant procedure.

II. Overview

Cold storage of extremities is the current gold standard preservation method prior to replantation or transplantation. Cold storage slows the metabolic rate of biological tissues; however, cold storage cannot entirely prevent damage from depletion of oxygen and energy sources (ischemia). As a result, extremities can only be stored in cold storage for a limited time, approximately 6 to 12 hours, before permanent damage occurs. The best outcomes are reported for revascularization of extremities within 2 hours. These storage times are too short to be useful in many cases, especially if other lifesaving treatments are required before transplantation or replantation, or if other delays in treatment occur.

In contrast, normothermic machine perfusion can maintain the physiologic metabolism of an extremity, avoiding the deleterious effects of hypoxia (low oxygen levels in the tissues), hypothermia (cooling), and nutrient deprivation that occur with prolonged cold storage. Normothermic machine perfusion can preserve a detached biological tissue, including extremities, at least two to four times longer than cold storage. A portable normothermic perfusion machine can preserve detached biological tissues that needs to be transferred from on location to another for transplantation or replantation (e.g., from the site of trauma to a medical center, from one location in a medical center to another, from one medical center to another, etc.). The portable, normothermic perfusion machine can permit the transport of detached biologic tissues to any location in the world. Accordingly, described herein are systems and methods of using a portable, ex vivo normothermic machine that can perfuse detached biological tissue (e.g., an arm, a leg, a heart, a lung, tissue graft, etc.) to preserve the detached biological tissue.

III. Systems

An aspect of the present disclosure can include a system 10 that employs a portable, ex vivo perfusion machine that can be used, for example, for preserving detached biological tissue, as shown in FIG. 1. The system 10 can create a mobile, normothermic environment for a tissue that mimics the physiological environment of the tissue to improve the quality and duration of tissue storage before ischemia, hypoxia, or other deleterious outcomes begin to affect the tissue. Mobility of the ex vivo perfusion system combined with longer preservation times from normothermic machine perfusion (2-4 times longer than cold storage) can allow a detached biological tissue to reach patients in any location in the world for transplantation or replantation. The system 10 can be used, for example, to transport an organ from a transplant donor in New York City to a transplant recipient patient in London. As another example, the system 10 can also be used to maintain the viability of a limb severed in a traumatic accident or in a fire fight until the patient is in a safe and stable condition for replantation of the severed limb.

The portable, ex vivo perfusion machine of system 10 can include a receptacle 12 sized and dimensioned to house a detached biological tissue 14 in a normothermic environment and a perfusion core 16 adapted to maintain the normothermic environment for the detached biological tissue 14 by pumping a perfusate through the detached biological tissue. A normothermic environment mimics at least one of the physiologic temperature, pressure, and humidity of the detached biological tissue 14 to decrease the onset of cellular damage and to elongate tissue survival time. At least one conduit 18 can be adapted to connect the perfusion core 16 to the detached biological tissue 14. The at least one conduit 18 is indicated in FIGS. 1 and 3-6 using bolded lines (dashed where the conduit can pass through another component of the system) with arrows indicating the direction of perfusate flow in the at least one conduit. The at least one conduit can be, for example, polyvinyl tubing, silicon tubing, or any other tube-like structure with an interior lumen that can allow the flow therethrough of a liquid or gas. The at least one conduit 18 can facilitate the transfer of the perfusate from the perfusion core 16 into and through the detached biological tissue 14. The detached biological tissue 14 can include a detached extremity, an ex-vivo body part, and/or a vascularized composite allograft (e.g., an arm, a leg, a heart, a lung, tissue graft, etc.). When the detached biological tissue 14 is a vascularized composite allograft the vascularized composite allograft can be a free flap. The receptacle 12 can be configured to house a specific type of detached biological tissue 14, for example a forearm or a hand, or the receptacle can be configured as a universal housing for any type of detached biological tissue. The perfusate that can be perfused through the system 10 and the detached biological tissue 14 can be any perfusate known. For example, the perfusate can comprise a colloid solution with physiologic concentrations of albumin, glucose, electrolytes, and an oxygen carrier (e.g., washed red blood cells).

The system 10 can also include at least one detection device 20, at least one parameter control device 22, and a controller 24 connected to the at least one detection device and the at least one parameter control device. The controller 24 includes a non-transitory memory 26 and a processor 28 for controlling the perfusion of the detached biological tissue 14 by maintaining the values of parameters measured by the detection devices 20 within predetermined thresholds using parameter control devices 22 within the system 10. The at least one detection device 20 can measure a parameter during perfusion of the detached biological tissue 14. The at least one detection device 20 is shown in FIG. 1 as intersecting the at least one conduit 18, but the at least one detection device 20 can be positioned in any portion of the system 10. When the at least one detection device 20 is more than one detection device, each device can be positioned in the same or different portions of the system 10 depending on the parameter to be detected. The at least one detection device 20 can be positioned in at least one of the receptacle 12, the perfusion core 16, and the at least one conduit 18. The parameter measured by the at least one detection device 20 can be a metabolic parameter or a physiologic parameter depending on the type and location of the at least one detection device. Metabolic parameters can include, but are not limited to, glucose concentrations and lactate concentrations measured in the perfusate housed in the perfusion core 16 or the at least one conduit 18. Physiologic parameters can include, but are not limited to, temperature of the detached biological tissue 14; pressures in the receptacle 12, within the detached biological tissue, or within the at least one conduit 18; and oxygen saturation in the detached biological tissue. That least one detection device 20 can be, but is not limited to, one or more of a flow-through biosensor, an in-line biosensor, an electrochemical sensor, an electro-optical sensor, or a pH sensor.

The at least one detection device 20 can be at least one of: a tissue oximeter, a scale or load sensor, a pressure sensor, a pH sensor, an ion-selective electrode, and a sensor adapted to measure at least one of metabolite concentrations and/or blood gas concentrations in the perfusate. A tissue oximeter can be adapted to measure oxygen saturation in one or more regions of the detached biological tissue 14 in the receptacle 12. For example, when the detached biological tissue 14 is a limb, the tissue oximeter can be a near infrared sensor on the surface of the skin to detect tissue oxygenation at different depths within the limb. A scale or load sensor can be positioned within or adjacent to the receptacle 12 and can continuously measure the mass of the detached biological tissue 14. Not wishing to be bound by theory, a rapid or significant (e.g., 5% or greater) increase in mass of a detached biological tissue 14 is indicative of a tissue injury (e.g., edema, cell death, etc.) A pressure sensor can be adapted to measure the pressure of the perfusate when the perfusate is at a location anywhere in the system 10. A pH sensor can be adapted to continuously, or at times specified by a user of the system 10 (e.g., a medical professional), measure the pH of the perfusate in at least one of the perfusion core 16 and the at least one conduit 18. An ion-selective electrode can be adapted to measure electrolyte concentrations (e.g., Na+, K+, Ca++, etc.) in the perfusate in the perfusion core 16 and/or the at least one conduit 18.

A sensor adapted to measure metabolite concentrations and/or blood gas concentrations in the perfusate can be positioned in at least one of the tissue 14, the perfusion core 16, and the at least one conduit 18. The measured metabolite concentrations can include, but are not limited to, glucose concentrations and lactate concentrations. Not wishing to be bound by theory, glucose concentrations can be used to assess the metabolic function of the detached biological tissue 14 by determining the amount of glucose used by the detached biological tissue to generate energy. Lactate is a marker of anaerobic activity and, not wishing to be bound by theory, lactate concentrations can be used to determine the occurrence of injuries (e.g., end perfusion lactate levels above 5 mmol can be indicators of poor post-transplant outcomes for a heart and levels above 15 mmol can be indicators of poor post-transplant outcomes for a limb). The measured blood gas concentrations can include, but are not limited to, oxygen and carbon dioxide concentrations. Other metabolite and blood gas concentrations that indicate the health of a detached biological tissue 14 can also be measured. More than one type of each sensor can be positioned in the system 10 when the at least one detection device 20 is more than one.

The least one parameter control device 22 can maintain the parameter within at least one predetermined threshold. The at least one parameter control device 22 is shown in FIG. 1 as intersecting the at least one conduit 18 but can also be positioned in any portion of the system 10. When the at least one parameter control device 22 is more than one parameter control device, each device can be positioned in the same or different portions of the system 10. A parameter control device can be at least one of: a pump, an oxygenator, a heating element, and a source of gas mixture. The pump can be adapted to control at least one of the concentration of at least one substrate, nutrient, electrolyte, or buffer added into the perfusate and/or the flow of the perfusate through the system 10. The pump can be, but is not limited to, at least one of an infusion pump, a peristaltic pump, or a roller pump. The oxygenator can be adapted to oxygenate the perfusate as the perfusate flows from the perfusion core 16 through the at least one conduit 18 towards the detached biological tissue 14. The heating element can be adapted to maintain the detached biological tissue 14 at a normothermic temperature. The source of a gas mixture can be connected to the oxygenator and adapted to provide a quantity of the gas mixture to the perfusate and to maintain a desired pH level of the perfusate. The gas mixture can be a combination of at least oxygen and carbon dioxide (e.g., in some instances, oxygen is much more prevalent than carbon dioxide in a hyperoxygenated environment; for example, $O_2$ can be more than 50%, more than 75%, more than 85%, and more than 95%; one non-limiting example is 97.5% $O_2$ and 2.5% $CO_2$).

The system 10 can also include a controller 24 comprising a non-transitory memory 26 storing executable instructions and a processor 28 to execute the instructions stored in the memory. The controller 24 can be coupled to the receptacle 12, the perfusion core 16, the at least one conduit 18, the at least one detection device 20, and/or the at least one parameter control device 22. In some instances, one or more of couplings can be via a wired connection. In other instances, one or more of the couplings can be via a wireless connection. In still other instances, one or more of the couplings can be via a connection that is both wired and wireless. Similarly, in some instances, the one or more couplings can be via a wireless connection and/or a wired connection. Additionally, each element of the system 10 may have additional components to aid in the coupling that are not illustrated.

Figure 2:
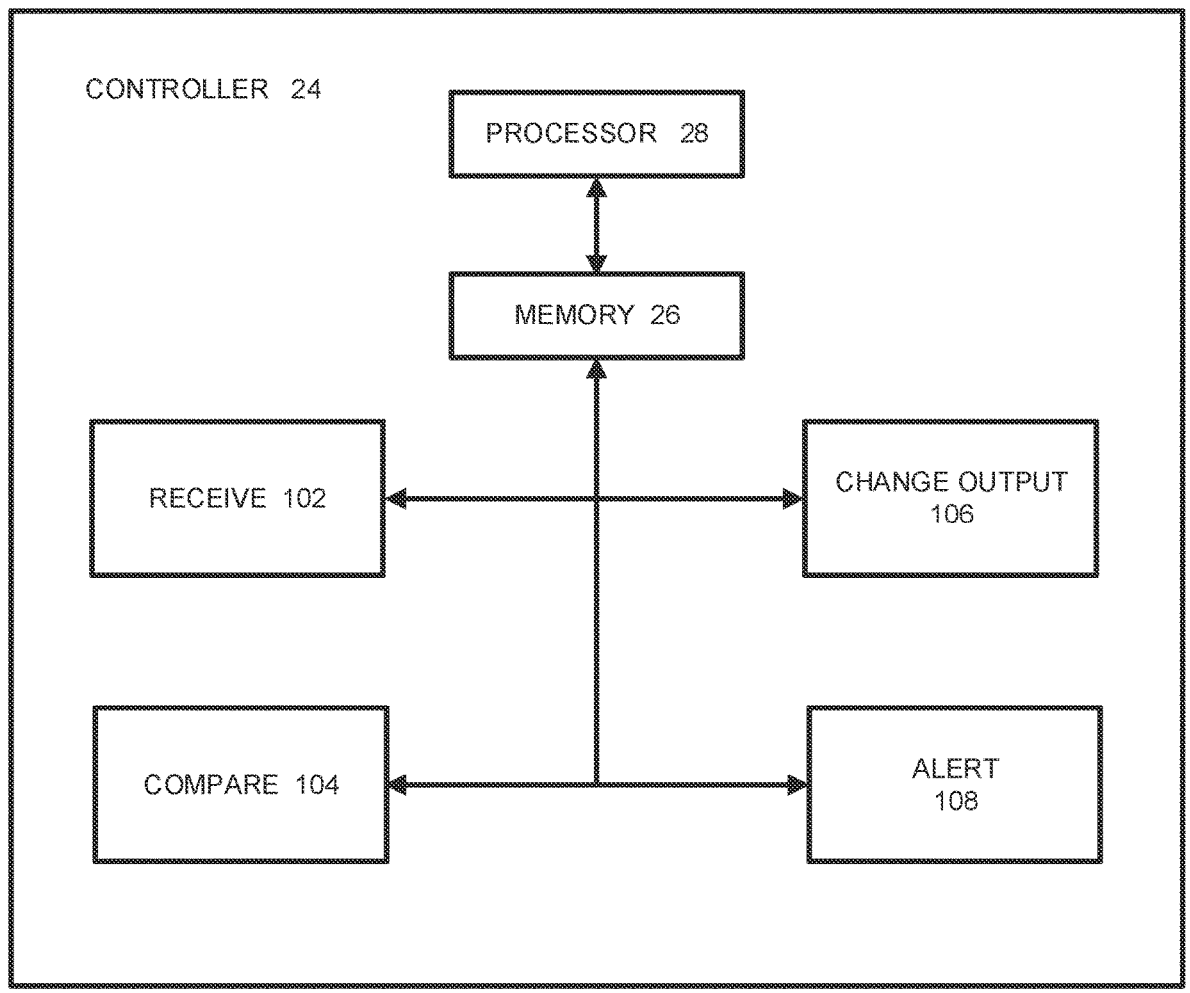
FIG. 2 is a block diagram of the controller of the portable, ex vivo, normothermic perfusion machine of FIG. 1.

As shown in FIG. 2, the controller 24 can include at least the non-transitory memory 26 and the processor 28. The non-transitory memory 26 can store machine executable instructions, which are executable by the processor 28. In some instances, the non-transitory memory 26 can be combined in a single hardware element (e.g., a microprocessor), but in other instances, the non-transitory memory and the processor can include at least partially distinct hardware elements. At 102, the controller 24 can receive the parameter measured by the at least one detection device 20 in the system 10 and then, at 104, the controller can compare the parameter to the at least one predetermined threshold for the parameter. The at least one predetermined threshold can be stored in the non-transitory memory 26 and can include an upper limit and/or a lower limit that has been determined to be acceptable for the parameter. The predetermined threshold can be based on general data for the type of detached biological tissue or can be specialized based on the patient's and/or the biological tissue's 14 unique physiology. At 106, when the parameter is outside the at least one predetermined threshold the controller 24 can change an output of the at least one parameter control device 22 to maintain the parameter within the at least one predetermined threshold as the perfusate is transferred through the perfusion core 16, the at least one conduit 18, and the detached biological tissue 14. At 108, the controller 24 can also alert a user, such as a medical professional, of the parameter being outside the at least one predetermined threshold. The controller 24 can display the alert, and measurements from the at least one detection device 20, on a display device (not shown in FIG. 1).

Figure 3:
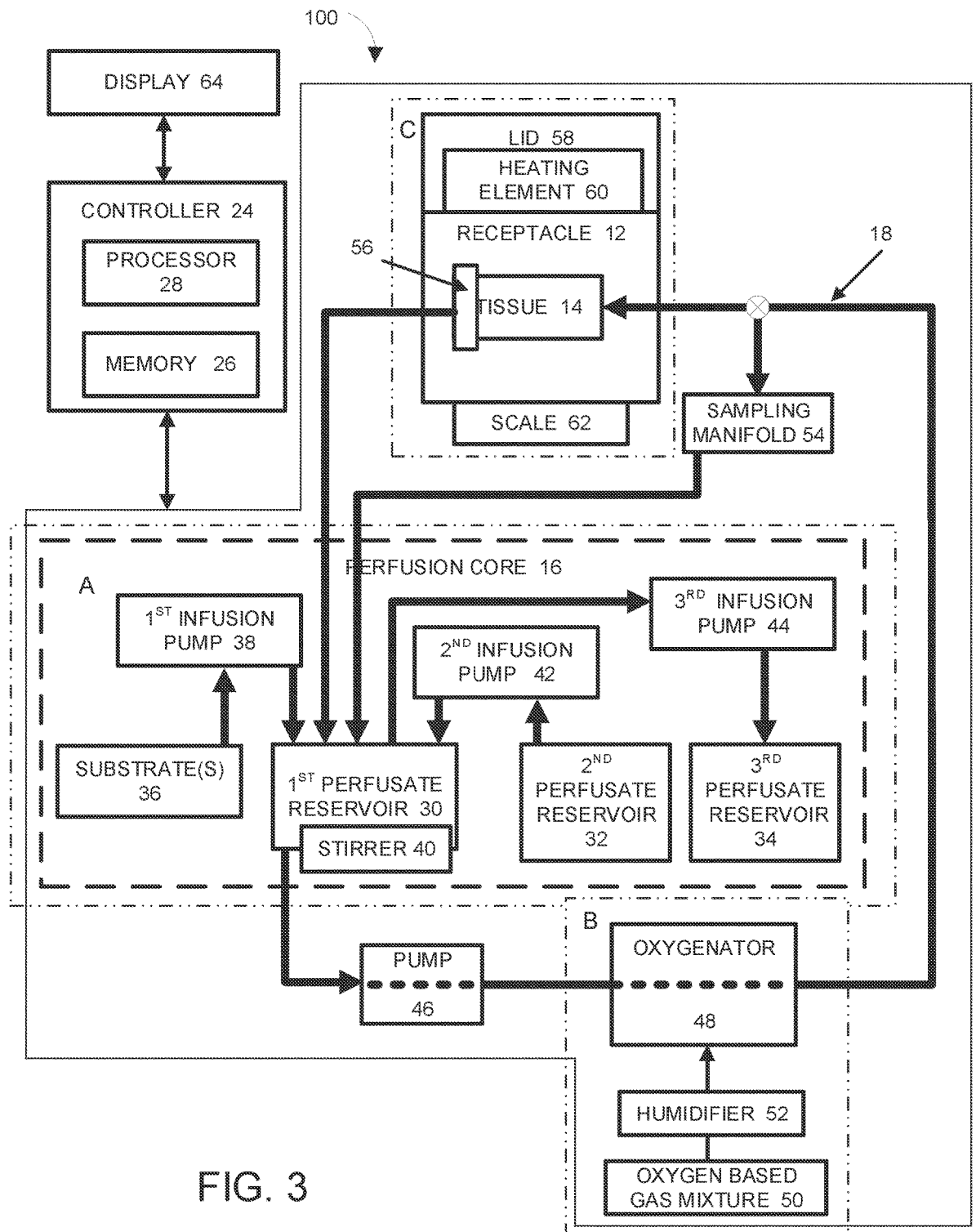
FIG. 3 is a schematic view of a more detailed example of the system of FIG. 1.
Figure 4:
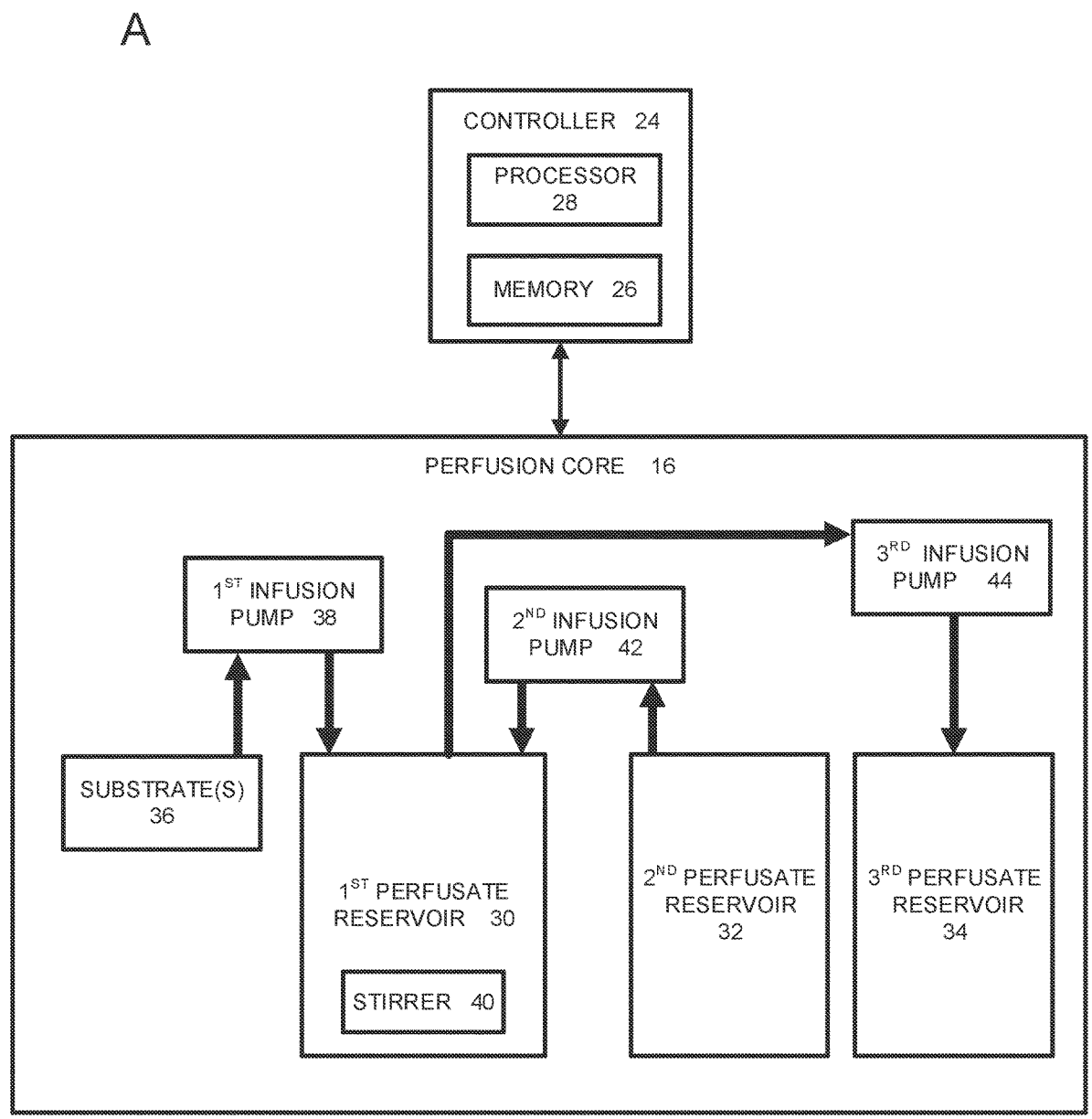
FIGS. 4-6 are schematic views of portions of the example of FIG. 3.

FIG. 3 shows a detailed example 100 of the system 10 shown in FIG. 1 and the path the perfusate can take when pumped from the perfusion core 16 through the at least one conduit 18 towards the detached biological tissue 14 and then back to the perfusion core. Regarding FIG. 3, the components included in the perfusion core 16 are outlined with a normal dashed lined and boxes A, B, and C, which include components of subsections of system 100, are outlined with a dashed lined composed of one long dash and two short dashes to indicate the subsections shown alone in FIGS. 4-6. The perfusion core 16, shown in detail in box A and in FIG. 4, can include a first perfusate reservoir 30, a second perfusate reservoir 32, and a third perfusate reservoir 34 connected by the at least one conduit 18. The controller 24 can be adapted to facilitate the exchange of perfusate between the first perfusate reservoir 30, the second perfusate reservoir 32, and the third perfusate reservoir 34 using at least one parameter control device (e.g., at least one infusion pump).

The first perfusate reservoir 30 can be adapted to house the perfusate and can be connected to an artery of the detached biological tissue 14 via the at least one conduit 18. The first perfusate reservoir 30 can also be connected to at least one substrate reservoir 36 via the at least one conduit 18 and a first infusion pump 38, where at least one substrate, nutrient, electrolyte, or other compounds can be added to the perfusate in the first perfusate reservoir and mixed with the perfusate via a stirrer 40, such as a magnetic stirrer, inside or adjacent to the first perfusate reservoir. Other compounds can include sodium bi-carbonate $NaHCO_3$. The second reservoir 32 can be adapted to house cooled perfusate and can be in fluid communication with the first perfusate reservoir 30 via the at least one conduit 18 and a second infusion pump 42. The cooled perfusate can be cooled via ice and/or a nitrogen gas mixture (e.g., 95% $N_2$ and 5% $CO_2$) (not shown) attached to the second perfusate reservoir 32. The controller 24 can pump cooled perfusate through the second perfusate reservoir 32 through the at least one conduit 18 via the second infusion pump 42. The third perfusate reservoir 34 can be adapted to house perfusate removed from the first perfusate reservoir 30 for accumulating too many analytes with at least one detection device in the first perfusate reservoir or the at least one conduit 18 (not shown) adapted to measure analyte concentrations in the perfusate. The at least one detection device 20 can be within the first perfusate reservoir 20 and/or the at least one conduit 18. Analytes can accumulate in the perfusate from the detached biological tissue during perfusion. Concentrations of analytes above predetermined concentration thresholds can have negative effects on perfusion on the detached biological tissue. The controller 24 can pump the perfusate from the first perfusate reservoir 30 to the third perfusate reservoir 34 via the at least one conduit 18 and a third infusion pump 44 in response to detecting a concentration of analytes above a predetermined threshold in the perfusate. Optionally, the controller 24 can pump a portion of the perfusate out of the first perfusate reservoir 30 into the third perfusate reservoir 34 and/or pump cooled perfusate, containing no extra analytes, from the second perfusate reservoir 32 into the first perfusate reservoir 30.

Figure 5:
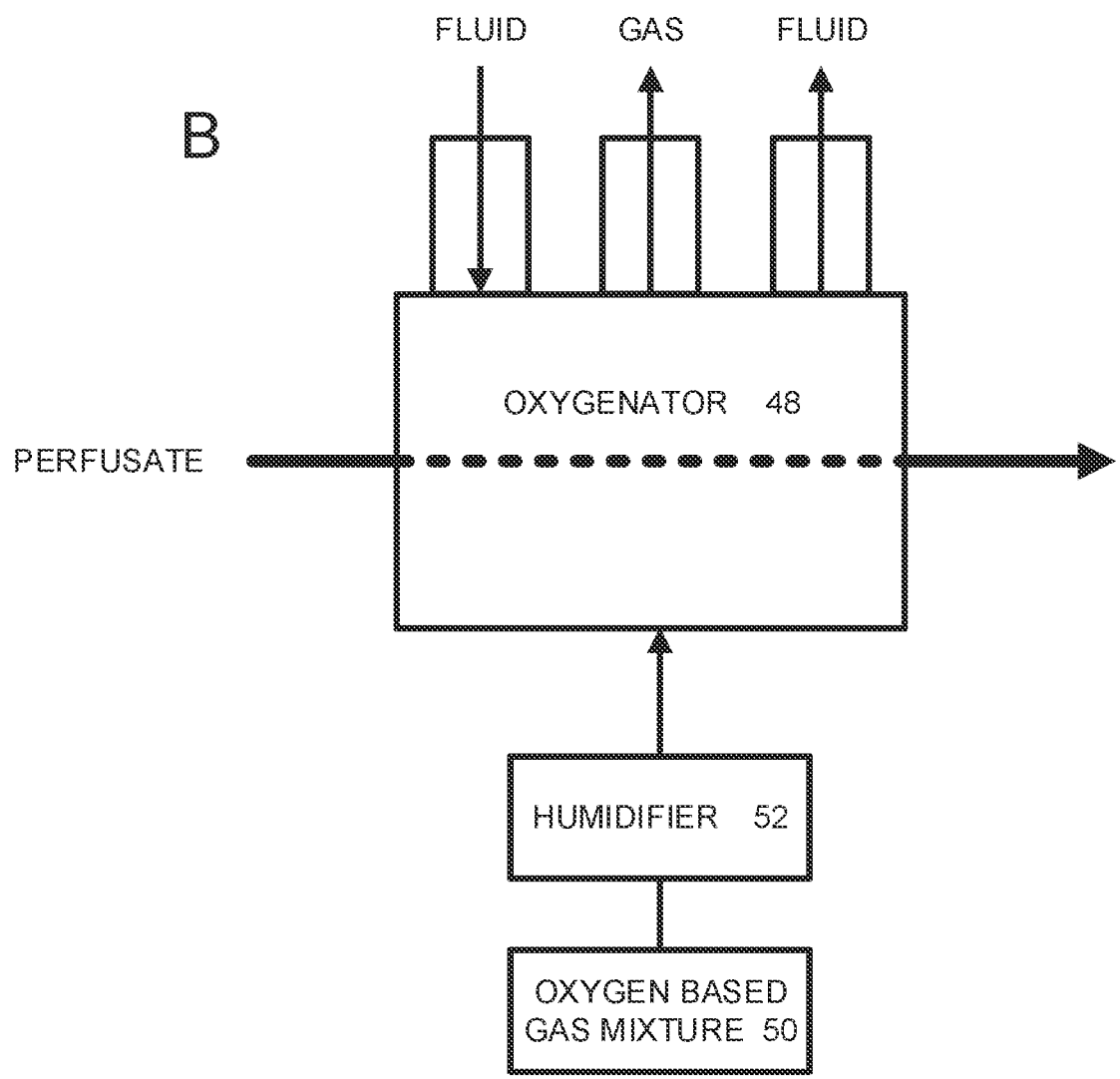
Figure 6:
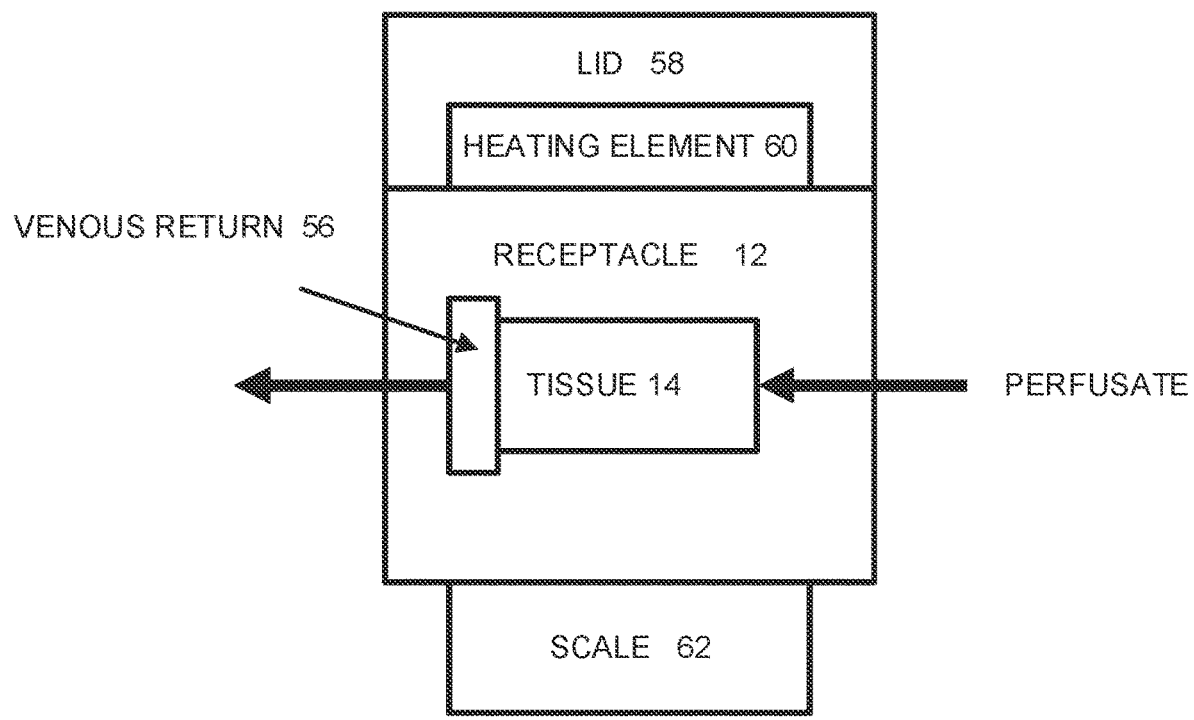

Referring again to FIG. 3, the controller 24 can pump the perfusate housed in the first perfusate reservoir 30 through the at least one conduit 18 via a pump 46 (e.g., a peristaltic pump or roller pump) through an oxygenator 48, shown in box B and in greater detail in FIG. 5. The oxygenator 48 can be in fluid communication with an oxygen-based gas mixture (e.g., 97.5% $O_2$ and 2.5% $CO_2$) 50 and humidifier 52. The oxygen-based gas mixture 50 can be humidified by passing through humidifier 52 before entering oxygenator 48. The oxygen-based gas mixture 50 can be stored in, for example, a concentrator or a gas tank. The oxygen-based gas mixture 50 can oxygenate the perfusate as it passes through the oxygenator (via the at least one conduit 18) by, for example, the gas mixture combining with an oxygen carrier in the perfusate. The oxygenator 48 can include an outlet for excess gas. The oxygenator 48 can also include a fluid inlet and a fluid outlet that can allow a fluid, such as water, to flow through the oxygenator to facilitate heating the perfusate to a normothermic temperature as the perfusate travels from the first perfusate reservoir 30 to the detached biological tissue 14. A perfusate that can mimic or nearly mimic the oxygen saturation of healthy patient's blood is an important part of maintaining a near physiologic environment for a detached biological tissue because biological tissues require oxygen to survive. A physiologic level of blood oxygen saturation can be between 60% and 100%, 80% and 100%, 90% to 100%, or 95% to 100% depending on if venous oxygen saturation or arterial oxygen saturation is measured. Venous oxygen saturation levels can be lower than arterial oxygen saturation levels without ischemia occurring.

Referring again to FIG. 3, the controller 24 (via pump 46) can move the oxygenated perfusate to the detached biological tissue 14 housed in receptacle 12 via the at least one conduit 18. Before the perfusate enters the detached biological tissue 14 the at least one conduit 18 can split (e.g., using a flow regulator) so a portion of the perfusate in the at least one conduit can flow into a sampling manifold 54 and a portion of the perfusate in the at least one conduit can flow into the detached biological tissue. The portion of the perfusate that enters the sampling manifold 54 can also be overflow perfusate. The sampling manifold 54 can include an outlet for a user of the system 100 to take a manual sample of the perfusate. The sampling manifold 54 can also be connected to the first perfusate reservoir 30 via the at least one conduit 18, to complete the circuit of the perfusate that does not perfuse the detached biological tissue 14 because it was diverted to the sampling manifold 54. The controller 24 can determine the rate at which the perfusate flows to the sampling manifold 54 via the flow regulator.

The controller 24 can pump perfusate through the at least one conduit 18 into the detached biological tissue 14, for example through a cannulation in an artery of the detached biological tissue. The perfusate can then perfuse through the detached biological tissue 14, optionally facilitated by pump 46, and out through a venous return cuff 56 to a perfusate collection receptacle (e.g., a perfusate reservoir). The venous return cuff 56 can be in fluid communication with the first perfusate reservoir 30 via that at least one conduit 18, where used perfusate can re-enter the first perfusate reservoir, thereby completing the machine perfusion circuit. The detached biological tissue 14 can housed in a receptacle 12, shown in box C and in larger detail in FIG. 6. The receptacle 12 can be sized and dimensioned for a specific type of detached biological tissue 14 (e.g., a limb, a heart, a lung, tissue graft, etc.) or the receptacle can be universally sized and dimensioned to hold any type of detached biological tissue. The receptacle 12 can include a lid 58 to completely enclose the detached biological tissue 14 in the receptacle. The lid 58 of the receptacle 12 can include a heating element 60, such as heating coils, adapted to prevent or minimize evaporation of the perfusate and to maintain a normothermic temperature in the receptacle. For example, the heating element 60 can maintain a temperature between 36 degrees Celsius and 38 degrees Celsius or a temperature between 32 degrees Celsius and 35 degrees Celsius. A normothermic temperature mimics the physiologic temperature of biological tissue before detachment. The receptacle 12 can also include a scale or load sensor 62 adapted to continuously measure the mass of the detached biological tissue 14. The weight of the detached biological tissue 14 can be an important indicator of the health of the detached biological tissue. For example, when the mass of the detached biological tissue 14 is heavier than normal it can be an indicator of the onset of tissue injury that will lead to failure of the organ.

As shown in FIG. 3, the system 100 also includes a display device 64 connected to the controller 24. The display device 24 can be adapted to display measurements from the one or more detection device 20 positioned throughout the system 100 and discussed above. The display device 64 can also be adapted to display alerts when a parameter detected by the one or more detection device 20 is outside of the at least one predetermined threshold. The alert can be at least one of visual, auditory, or tactile. The display device 64 can also be a user interface for a user of the system 100 to program the controller 24 with, for example, the pre-determined thresholds for parameters and the type of detached biological tissue 14 housed in the receptacle 12.

Figure 7:
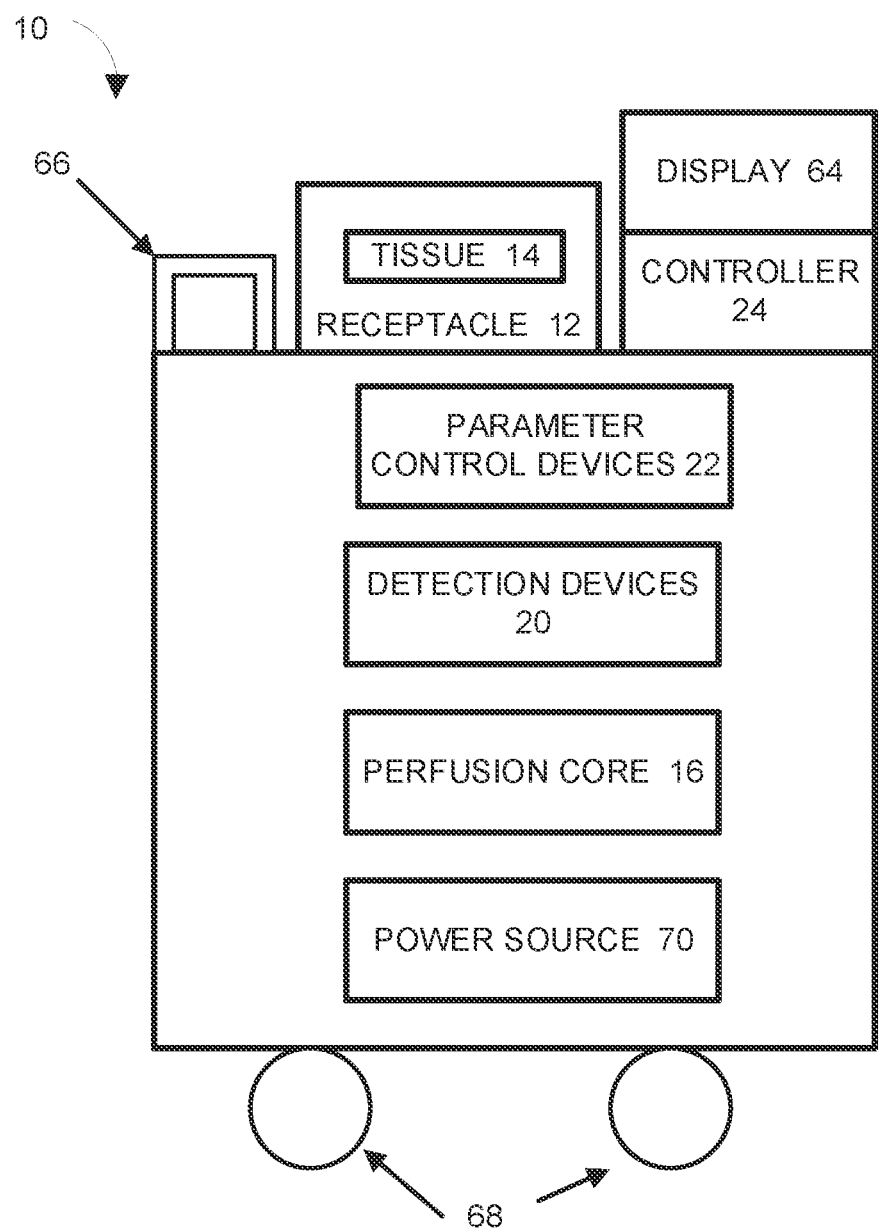
FIG. 7 is a schematic diagram of an example implementation of the system of FIG. 1.

Referring now to FIG. 7, which shows a block diagram example configuration of the system 10, the system can also include a handle 66 and/or wheels 68 to facilitate moving the system and a portable power source 70. FIG. 7 is only one example configuration of the system 10, a person of ordinary skill in the art would understand that system 10 can have many other configurations that are portable. The portable power source 70 can be adapted to power the system 10 without need for the system 10 to stay permanently attached to a stationary power source (e.g., a wall or floor outlet). Portability of the system 10 in combination with longer preservation times from normothermic machine perfusion can allow a detached biological tissue 14 to reach patients in any location in the world for transplantation or replantation.

IV. Methods

Another aspect of the present disclosure can include methods 200 and 300 (FIGS. 8 and 9) for preserving a detached biological tissue ex vivo and for exchanging perfusate within a system, where the system can be the portable, ex vivo perfusion system 10 or any of its aspects described above. The methods are illustrated as process flow diagrams with flowchart illustrations. For purposes of simplicity, the methods are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods 200 and 300. The methods can be implemented by at least a portion of the system shown in any one of FIGS. 1-7.

Figure 8:
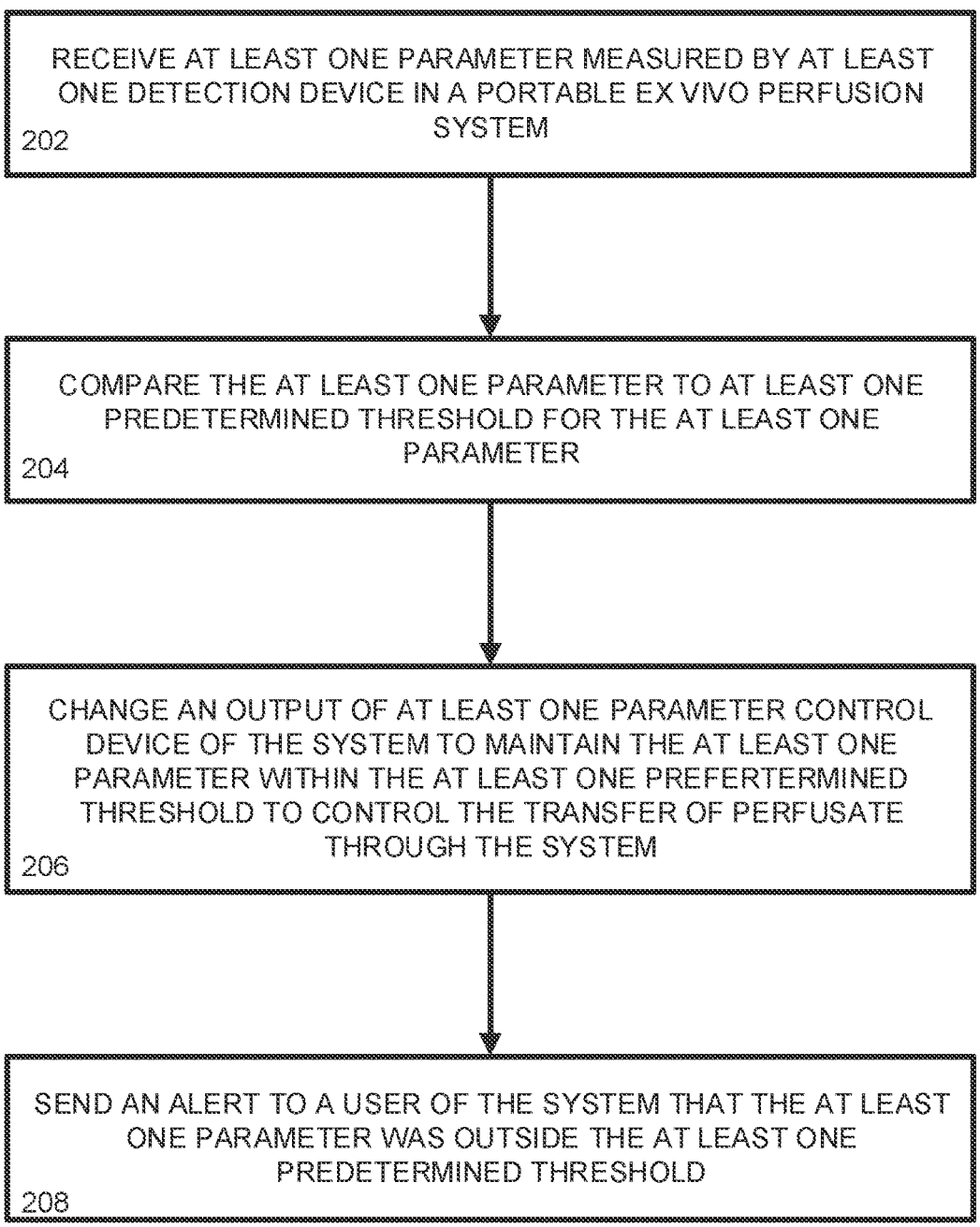
FIG. 8 is a process flow diagram of a method for preserving an ex vivo biological tissue.

FIG. 8 illustrates a method 200 for preserving a detached biological tissue ex vivo. Portability of the ex vivo perfusion system used to execute the method of FIG. 8 in combination with longer preservation times from normothermic machine perfusion can allow a detached biological tissue (e.g., a limb, a heart, a lung, tissue graft, etc.) to reach patients in any location in the world for transplantation or replantation.

At Step 202 a controller comprising a processor can receive at least one parameter measured by at least one detection device in a portable, ex vivo perfusion system. The portable, ex vivo perfusion system can include a receptacle sized and dimensioned to house the detached biological tissue in a normothermic environment and a perfusion core adapted to maintain the normothermic environment for the detached biological tissue by pumping a perfusate through the detached biological tissue. At least one conduit can be adapted to connect the perfusion core with the detached biological tissue and to transfer the perfusate from the perfusion core into and through the detached biological tissue. The at least one detection device can be configured to measure the at least one parameter during perfusion of the detached biological tissue. The at least one parameter can be a metabolic parameter (e.g., glucose concentration, lactate concentration, etc.) or a physiologic parameter (e.g., temperature, pressure, oxygen saturation, etc.) depending on the type and location of the at least one detection device.

A detection device can be, but is not limited to, at least one of: a tissue oximeter, a scale or load sensor, a pressure sensor, a pH sensor, an ion selective electrode, and a sensor adapted to measure metabolite concentrations and/or blood gas concentrations in the perfusate. A tissue oximeter can be adapted to measure oxygen saturation in one or more regions of the detached biological tissue. A scale or load sensor can be adapted to continuously, or at predetermined times, measure the mass of the detached biological tissue. A pressure sensor can be adapted to measure pressure of the perfusate at a location anywhere in the system (e.g., in the conduit, the perfusion reservoir, the tissue, the receptacle, etc.). A pH sensor can be adapted to continuously monitor the pH of the perfusate. An ion selective electrode can be adapted to measure electrolyte concentrations in the perfusate. A sensor adapted to measure metabolite concentrations and/or blood gas concentrations can be adapted to be positioned anywhere in the system. The measured metabolite concentrations can include, but are not limited to, glucose concentrations and lactate concentrations. The measured blood gas concentrations can include, but are not limited to, oxygen and carbon dioxide concentrations. Other metabolite and blood gas concentrations that indicate the health of a detached biological tissue 14 can also be measured.

At Step 204 the controller can compare the at least one parameter measured by the at least one detection device to at least one predetermined threshold (e.g., based on the identity of the detached biological tissue) for the at least one parameter. When the controller determines the at least one parameter is outside the at least one predetermined threshold, the controller can, at Step 206, change an output of at least one parameter control device of the system to maintain the at least one parameter within the at least one predetermined threshold. Changing the output of the at least one parameter control device can control the transfer of the perfusate through the perfusion core, the at least one conduit, and the detached biological tissue. A parameter control device can be, but is not limited to, at least one of: a pump, an oxygenator, a heating element, and a source of a gas mixture connected to the oxygenator. A pump can be adapted to control at least one concentration of a substrate, nutrient, or electrolyte added into the perfusate and/or the flow of the perfusate through the system. An oxygenator can be adapted to oxygenate the perfusate as the perfusate is pumped from the first perfusate reservoir toward the detached biological tissue. A heat element can be adapted to maintain the detached biological tissue at a normothermic temperature, for example, as a part of the receptacle of the tissue. A source of the gas mixture connected to the oxygenator can be a combination of oxygen and carbon dioxide and can be adapted to provide a quantity of the gas mixture to the perfusate and to maintain a desired pH level of the perfusate.

At Step 208, the controller can send an alert to a user of the system that the at least one parameter was outside the at least one predetermined threshold. The alert can be at least one of visual, tactile, or auditory. The controller can be connected with a display for displaying the alerts when the at least one parameter was outside the at least one predetermined threshold. The display connected to the controller can also display at least one of the measurements of the at least one parameter and the at least one predetermined threshold. The controller can be connected to a parameter control device that is a heating element and can maintain a normothermic temperature in the receptacle of the detached biological tissue. The heat element can be configured to be positioned in a lid of the receptacle.

FIG. 9 illustrates a method 300 for exchanging perfusate within a portable, ex vivo perfusion system having a perfusion core that is being used to preserve a detached biological tissue. The perfusion core can include a first, second, and third perfusate reservoir each adapted for holding perfusate. The perfusion core can also include a first, second, and third infusion pump. The first, second, and third infusion pumps can each be connected to the controller. At Step 302, the controller can pump, by the first infusion pump, a substrate infusion, from a substrate reservoir, into the first perfusate reservoir. Other compounds, such as electrolytes (e.g., Na+, K+, Ca++, etc.), and sodium bi-carbonate $NAHCO_3$, can also be added to the perfusate by at least one other pump. At Step 304, the controller can mix, by a stirrer such as a magnetic stirrer, the perfusate in the first perfusate reservoir with the substrate infusion, and other compounds added to the first perfusate reservoir. The stirrer can be connected to the controller and located in and/or adjacent to the first perfusate reservoir. At Step 306, the controller can detect, by the at least one detection device, when concentrations of compounds within the perfusate and/or concentrations of the substrate are outside of at least one predetermined concentration level (e.g., outside at least one predetermined threshold).

At Step 308, the controller can exchange, by the second infusion pump, perfusate from the second perfusate reservoir to the first perfusate reservoir when the amount of perfusate in the first perfusate reservoir is below the at least one predetermined concentration level. The second perfusate reservoir can hold cooled perfusate (e.g., cooled on ice and/or with a nitrogen gas mixture) with no additional compounds added. The addition of the cooled perfusate to the first perfusate reservoir can increase the concentrations of perfusate compared to the substrates and analytes detected by the at least one detection device without having to remove perfusate from the first perfusate reservoir.

At Step 310, the controller can detect, by the at least one detection device, that a concentration of analytes in the perfusate is above a predetermined concentration threshold after the perfusate has perfused the detached biological tissue. Analytes enter the perfusate from the detached biological tissue and can be detrimental to effective perfusion of the detached biological tissue when their concentration in the perfusate is above a predetermined level. At Step 312, the controller can remove, via the third infusion pump, at least a portion of the perfusate comprising the analytes from the first perfusate reservoir to the third perfusate reservoir (e.g., to be discarded or cleaned of analytes by a user). The controller can then add clean, cooled perfusate, via the second infusion pump, and additional substrates, via the first infusion pump to the first perfusate reservoir to maintain an amount of perfusate circulating through the system.

From the above description, those skilled in the art will perceive improvements, changes and modifications. Such improvements, changes and modifications are within the skill of one in the art and are intended to be covered by the appended claims.

What is claimed is:

1. A method for preserving a detached biological tissue ex vivo, comprising:
   receiving, by a controller comprising a processor, at least one parameter measured by at least one detection device in a portable ex vivo perfusion system, wherein the system comprises:
      a receptacle sized and dimensioned to house the detached biological tissue in a normothermic environment,
      a perfusion core adapted to maintain the normothermic environment for the detached biological tissue by pumping a perfusate through the detached biological tissue, and
      at least one conduit adapted to connect the perfusion core with the detached biological tissue and to transfer the perfusate from the perfusion core into and through the detached biological tissue,
      wherein the at least one detection device is configured to measure the at least one parameter during perfusion of the detached biological tissue, wherein the at least one parameter is a metabolic parameter or a physiologic parameter;
   comparing, by the controller, the at least one parameter to at least one predetermined threshold for the at least one parameter; and
   when the at least one parameter is outside the at least one predetermined threshold:
      changing, by the controller, an output of at least one parameter control device of the system to maintain the at least one parameter within the at least one predetermined threshold to control the transfer of the perfusate through the perfusion core, the at least one conduit, and the detached biological tissue; and
      sending, by the controller, an alert to a user of the system that the at least one parameter was outside the at least one predetermined threshold.

2. The method of claim 1, further comprising displaying, via a display connected to the controller, at least one of the measurements of the at least one parameter, the at least one predetermined threshold, and the alerts when the at least one parameter is outside the at least one predetermined threshold.

3. The method of claim 1, wherein the perfusion core further comprises a first perfusate reservoir and a first infusion pump, further comprising:
   pumping, by the first infusion pump connected to the controller, a substrate infusion into the first perfusate reservoir, wherein the first perfusate reservoir holds the perfusate;
   mixing, by a magnetic stirrer connected to the controller, the perfusate in the first perfusate reservoir with the substrate infusion; and
   detecting, by the controller and the at least one detection device, when concentrations of the perfusate and/or the substrate in the first perfusate reservoir are outside at least one predetermined concentration level.

4. The method of claim 3, wherein the perfusion core further comprises a second perfusate reservoir and a second infusion pump, further comprising:
   exchanging, by the second infusion pump connected to the controller, perfusate from the second perfusate reservoir to the first perfusate reservoir, when the amount of perfusate in the first perfusate reservoir is below the at least one predetermined concentration level.

5. The method of claim 3, wherein the perfusion core further comprises a third perfusate reservoir and a third infusion pump, further comprising:
   detecting, by the controller and the at least one detection device, that a concentration of analytes in the perfusate is above a predetermined concentration threshold; and
   removing, by the third infusion pump connected to the controller, at least a portion of the perfusate comprising the analytes from the first perfusate reservoir to the third perfusate reservoir.

6. The method of claim 1, further comprising maintaining, by a heating element connected to the controller, a normothermic temperature in the receptacle, wherein the heating element is configured to be positioned in a lid of the receptacle.

7. The method of claim 6, wherein the normothermic temperature is between 32 degrees Celsius and 38 degrees Celsius.

8. The method of claim 1, wherein the detached biological tissue is one of a detached extremity, an ex-vivo body part, or a vascularized composite allograft.

9. The method of claim 1, wherein the detached biological tissue is a vascularized composite allograft, and wherein the vascularized composite allograft is a free flap.

10. The method of claim 1, further comprising detecting, by the controller and the at least one detection device, oxygen saturation in one or more regions of the detached biological tissue at a time, wherein the at least one detection device comprises at least one tissue oximeter.

11. The method of claim 10, wherein the at least one tissue oximeter is a near infrared sensor positioned on a surface of skin of the detached biological tissue.

12. The method of claim 1, further comprising detecting, by the controller and the at least one detection device, a mass of the detached biological tissue at a time, wherein the at least one detection device comprises a load sensor.

13. The method of claim 12, further comprising alerting, via a display connected to the controller, when the mass of the detached biological tissue at the time is heavier than expected for the detached biological tissue, wherein the alert indicates possible onset of tissue injury.

14. The method of claim 1, further comprising detecting, by the controller and the at least one detection device, a pressure of the perfusate at at least one location in the system, wherein the at least one detection device comprises at least one pressure sensor.

15. The method of claim 14, wherein the at least one location in the system comprises at least one of in the at least one conduit, the perfusion reservoir, the detached biological tissue, and the receptacle.

16. The method of claim 1, further comprising detecting, by the controller and the at least one detection device, a pH of the perfusate, wherein the at least one detection device comprises at least one pH sensor.

17. The method of claim 1, further comprising detecting, by the controller and the at least one detection device, at least one electrolyte concentration in the perfusate, wherein the at least one detection device comprises at least one ion-selective electrode adapted to measure the at least one electrolyte concentration.

18. The method of claim 1, further comprising detecting, by the controller and the at least one detection device, at least one of metabolite concentrations and blood gas concentrations in the perfusate,
wherein the at least one detection device comprises plurality of sensors adapted to measure the at least one of metabolite concentrations and the blood gas concentrations.

19. The method of claim 18, wherein the metabolite concentrations measured include glucose concentrations and lactate concentrations.

20. The method of claim 18, wherein the measured blood gas concentrations comprise at least one of oxygen concentration and carbon dioxide concentration.

* * * * *